United States Patent Office 3,592,602
Patented July 13, 1971

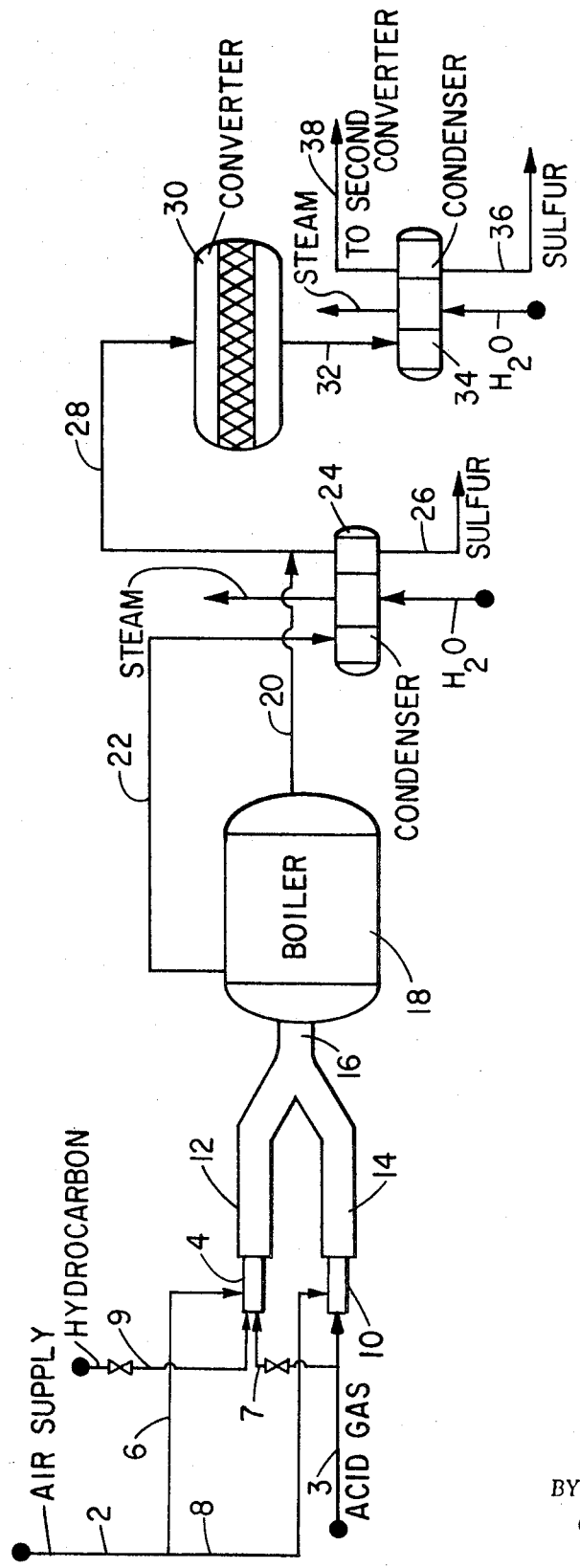

3,592,602
HIGH TURN-DOWN RATIO DESIGN FOR SULFUR PLANTS
John W. Palm, Tulsa, Okla., assignor to Pan American Petroleum Corporation, Tulsa, Okla.
Filed Feb. 10, 1969, Ser. No. 797,789
Int. Cl. C01b 17/04
U.S. Cl. 23—225                                            3 Claims

ABSTRACT OF THE DISCLOSURE

To avoid abnormally low temperatures and flow rates in a sulfur plant where high turn-down ratios are encountered in the recovery of free sulfur from hydrogen sulfide-containing gases, the acid gas stream is burned in a separate firing tunnel with enough air to convert one-third of the hydrogen sulfide into sulfur dioxide. To supplement the heat requirements and necessary gas volumes, a hydrocarbon fuel in amounts up to about 20 percent of the design acid gas feed rate is burned in a second firing tunnel. The products of combustion from these separate burning steps are combined and discharged into a boiler where a portion of the sulfur produced in the overall process is removed after which the resulting sulfur denuded stream is processed in conventional fashion.

SPECIFICATION

The present invention relates to the production of free sulfur from acid ($H_2S$-containing) gases. More particularly it is concerned with a procedure for producing free sulfur from such gases wherein the feed rate thereof to the sulfur recovery plant varies over a wide range. Specifically, this invention deals with plant operation at high turn-down ratios, i.e., the ratio of design feed rate to the lowest available feed rate. These wide fluctuations in feed rates are frequently experienced in refineries and depend on whether sweet or sour crude is being run. In some cases sulfur plant design specifications require a turn-down ratio as high as 11:1, resulting in a decrease in recovery to 90–91%. Turn-down ratios of 3:1 or 4:1 are about the maximum considered feasible in the case of conventional plant design.

BACKGROUND OF THE INVENTION

While it is known that free sulfur can be recovered from gases of widely varying hydrogen sulfide content, the problem to which the present invention is directed concerns acid gas streams in which the hydrogen sulfide content may range from about 45 to 100 mol percent and the feed rate of such gas to the sulfur recovery unit is subject to wide variation, e.g., from 100 percent down to less than 50 percent of the design feed rate.

With acid gas of the hydrogen sulfide concentration range contemplated herein, all of the gas—along with the proper amount of air—is fed to a burner, the combustion products from which exhaust into a furnace and, in turn, are discharged into a suitable waste heat boiler. The furnace acts as a non-catalytic reactor converting from about 40–60 percent of the hydrogen sulfide in the feed to free sulfur. The product sulfur is generally condensed from the boiler effluent before passing to the first reactor. The sulfur thus removed allows for a lower reactor feed temperature which improves yields without incurring catalyst deactivation by sulfur deposition.

When the acid gas feed rate to a sulfur recovery unit declines there are several adverse effects. For example, there is a decline in production of steam. Steam produced in the sulfur plant is normally a valuable byproduct required for various heating duties in the associated refinery or gas processing plant. A further disadvantage in a decrease in acid gas feed rate is evidenced by a decrease in mass velocity in the condenser causing sulfur fog formation, which tends to lower the overall sulfur yield. In addition, with feed rates substantially lower than those for which the plant is designed, there is always the problem of excessive heat losses from portions of the reaction system when high turn-down conditions exist. In operation of a sulfur recovery unit it is common practice to use what is referred to as "bypass reheat" for preheating the feed to the first reactor. This involves withdrawing a portion, e.g., 10–20 percent of the boiler effluent at a temperature of from about 900° F. to 1200° F. and mixing it with cooled (325° F.–375 F.) gas from the condenser handling the balance of the boiler effluent, to give a first reactor feed having a temperature of the order of 425° F.–450° F. When the gas flow rate through the boiler declines the temperature of the reheat gas is lowered because of more effective cooling in the waste heat boiler. It can be seen that with this type of reheating procedure if the feed rate is materially decreased a greater proportion of the boiler effluent must be used for preheating purposes in order for the reactant gases to be raised to the proper temperature level prior to entering the first reactor. This makes for difficuty in that the boiler effluent contains free sulfur in vapor form. The presence of a substantial concentration of sulfur in this reheat gas interferes with reaching equilibrium conditions in the first reactor, and accordingly, results in a loss in yield.

To overcome these adverse effects it is common practice in some sulfur plants to burn supplemental fuel in the furnace when the acid gas feed rate declines. However, when hydrocarbons are burned in the sulfur plant furnace with hydrogen sulfide there is a tendency to obtain incomplete combustion and to form free carbon because a deficiency of air is used. A certain amount of hydrocarbons of course can be burned satisfactorily but there is a limit to the precentage of hydrocarbons that can be mixed with hydrogen sulfide.

SUMMARY OF THE INVENTION

By the present invention I am able to operate at high turn-down ratios and still maintain entirely adequate steam production and sulfur plant operating conditions although the sulfur recovery in some instances may be decreased. Specifically, the process of my invention contemplates conditions wherein the acid gas feed rate is not more than about 50 percent of the design feed rate and wherein the hydrogen sulfide content of such acid gas stream is at least 45 mol percent. In carrying out an embodiment of my invention—where a high turn-down ratio is necessary—the acid gas stream (containing in excess of about 45 mol percent hydrogen sulfide) and the required amount of hydrocarbon are separately burned in twin furnaces or firing tubes. In the firing tube burning the hydrocarbon fuel the airhydrocarbon ratio employed is sufficient to obtain substantially complete combustion to carbon dioxide and water. In accordance with my invention hydrocarbon fuel such as, for example, natural gas, may be employed in amounts up to about 20 percent of the acid gas design feed rate to the system. Prior to my invention it has not been practical to burn such quantities of hydrocarbon fuel gas with the acid gas because under prior art conditions carbon and carbon-containing compounds were formed which resulted in poor quality sulfur, lower sulfur yields and lowering of catalyst efficiency in the catalytic converters down-stream of the furnace. The flame temperature is higher for hydrocarbons than for hydrogen sulfide and, therefore, the furnace or firing tube in which the hydrocarbon fuel is burned should be designed for operation at temperatures of the order of 3500° F. Operation of the acid gas firing tube is generally carried on at a temperature of about 2500° F.

The air supplied to the overall system is sufficient to burn all of the hydrocarbon to carbon dioxide and water and to convert about one-third of the hydrogen sulfide in the acid gas to sulfur dioxide. After combustion of the two separate streams in this manner the combustion products from each firing tube are combined before being processed in a catalytic converter to produce sulfur. These combustion products help to maintain the necessary gas mass velocity throughout the converter and condenser thus preventing the decline in reheat gas temperature, decline in steam production, increase in fog formation and excessive heat losses in the reaction system.

DESCRIPTION OF THE DRAWING

In the accompanying drawing air is supplied to the system via line 2 and acid gas via line 3. When operating at design feed rate part of the acid gas and air go through lines 6 and 7 to burner 4 and additional acid gas and air pass through lines 3 and 8 to burner 10. When the acid gas feed rate declines to less than about 50 percent of design, flow of acid gas to burner 4 is discontinued and hydrocarbon fuel is introduced into the system through line 9 at a rate of 170,000 cubic feet per day. Air flowing through line 8 is mixed with the acid gas in burner 10 in an amount sufficient to burn about one-third of the hydrogen sulfide therein to sulfur dioxide. Although the plant is designed for an acid gas feed rate of 10 million cubic feet per day the actual feed rate in this particular case, is only 1 million cubic feet per day, i.e., a turn-down ratio of 10:1. The mixtures in burners 4 and 10 are fed to firing tubes 12 and 14, respectively, where they are allowed to react separately, the mixture in tube 12 generating a temperature of about 3500° F. in converting all of the hydrocarbon fuel to carbon dioxide and water in firing tube 14 about one-third of the hydrogen sulfide is burned to sulfur dioxide to produce a temperature of about 2500° F. The products of combustion in tubes 12 and 13 are mixed in zone 16 prior to entering waste heat boiler 18. While in firing tube 14 a portion of the sulfur dioxide produced therein reacts non-catalytically with the hydrogen sulfide to form free sulfur. The quantity of sulfur thus produced often represents from about 40–60 percent of the total recoverable sulfur.

The gaseous mixture in zone 16 and discharged into the boiler comprises hydrogen sulfide, sulfur doxide, sulfur dioxide, sulfur vapors, carbon dioxide, nitrogen and water. In boiler 18 approximately 80–90 percent of this stream is cooled to about 500° F. to 650° F. The remainder—by flowing through only a single pass—is withdrawn via line 20 at a temperature of 900° F.–1200° F. and is used for reheat purposes. The cooler stream is withdrawn through line 22 and sent into condenser 24 where the sulfur (in vapor form) produced in firing tube 14 is condensed and withdrawn as a liquid through line 26. Uncondensed gases which are at a temperature of, for example, 325° F.–375° F. are taken off the top of condenser 24 through line 28. The gases in line 28 are preheated to a temperature of from 425° F. to about 450° F. by mixing with reheat gas in line 20 which, as previously mentioned, is at a temperature of from about 900° F. to 1200° F. Thereafter the preheated reaction mixture is transferred to catalytic converter 30 where additional product sulfur is formed and removed along with unconverted hydrogen sulfide and sulfur dioxide through line 32 at a temperature of about 550° F. to 600° F. and introduced into condenser 34, the resulting product sulfur being withdrawn therefrom via line 36. Again, uncondensed and unreacted gases are removed from condenser 34 through line 38 and sent to a second converter-condenser system not shown. The sulfur recovered when operating under conditions of this type amounts to about 90 percent of the theoretical.

From the foregoing discussion it will be recognized that I have developed a procedure which makes sulfur recovery practical at substantially any turn-down ratio. Specifically the case described immediately above demonstrates that when the acid gas feed rate to the plant is as low as 10 percent of the design rate it is possible to use the process of my invention to still obtain a sulfur recovery of about 90 percent. While the quantity of fuel gas required to accomplish the purpose of my invention may vary substantially, in general it will be found that the necessary amount corresponds to form about 1 to about 20 percent of a design acid gas feed rate.

I claim:

1. In the recovery of free sulfur from a stream of gas containing at least about 45 mol percent hydrogen sulfide wherein said gas is burned in a non-catalytic combustion zone under conditions such that about one-third of said hydrogen sulfide is converted to sulfur doxide and wherein the feed rate of said gas to said zone is less than about 50 percent of the design feed rate, conducting the resulting mixture of hydrogen sulfide and sulfur dioxide into a recation zone containing a catalyst capable of promoting the reaction between hydrogen sulfide and and sulfur dioxide to produce free sulfur, and recovered the latter by means of condensation from the product mixture thus formed, the improvement which comprises:

burning a hydrocarbon fuel in a zone separate from said combustion zone to convert said fuel substantially to carbon doxide and water, the amount of said hydrocarbon fuel corresponding up to about 20 percent of the hydrogen sulfide design feed rate to said combustion zone, and combining the combustion products from said zones in a heat transfer zone, whereby both the required mass velocity in said condensation step and the necessary stream production can be maintained.

2. The method of claim 1 in which the hydrocarbon fuel employed is natural gas.

3. The method of claim 1 in which the combustion steps in each of said zones is carried out by the use of air.

References Cited

UNITED STATES PATENTS

| | | |
|---|---|---|
| 2,389,071 | 11/1945 | Merriam. |
| 2,664,345 | 12/1953 | Kohl et al. |
| 3,297,409 | 1/1967 | Kunkel et al. |
| 3,399,970 | 9/1968 | Grekel et al. |

OSCAR R. VERTIZ, Primary Examiner

G. O. PETERS, Assistant Examiner

PO-1050
(5/69)

UNITED STATES PATENT OFFICE
CERTIFICATE OF CORRECTION

Patent No. 3,592,602                    Dated July 13, 1971

Inventor(s) John W. Palm

It is certified that error appears in the above-identified patent and that said Letters Patent are hereby corrected as shown below:

Column 3, line 34, after "water" insert -- while -- ; line 37 "13" should be -- 14 --.

Column 4, line 21, "form" should be -- from --.

Claim 1, line 33, "and" (second occurrence) should be deleted;
line 34, "recovered" should be -- recovering -- ;
line 46, "stream" should be -- steam --.

Signed and sealed this 4th day of January 1972.

(SEAL)
Attest:

EDWARD M. FLETCHER, JR.
Attesting Officer

ROBERT GOTTSCHALK
Acting Commissioner of Patents